Nov. 10, 1970  M. L. LOVE  3,540,028
SYSTEM FOR INDICATING VARIABLE HARVESTING MACHINE CONDITIONS
Filed Aug. 14, 1967
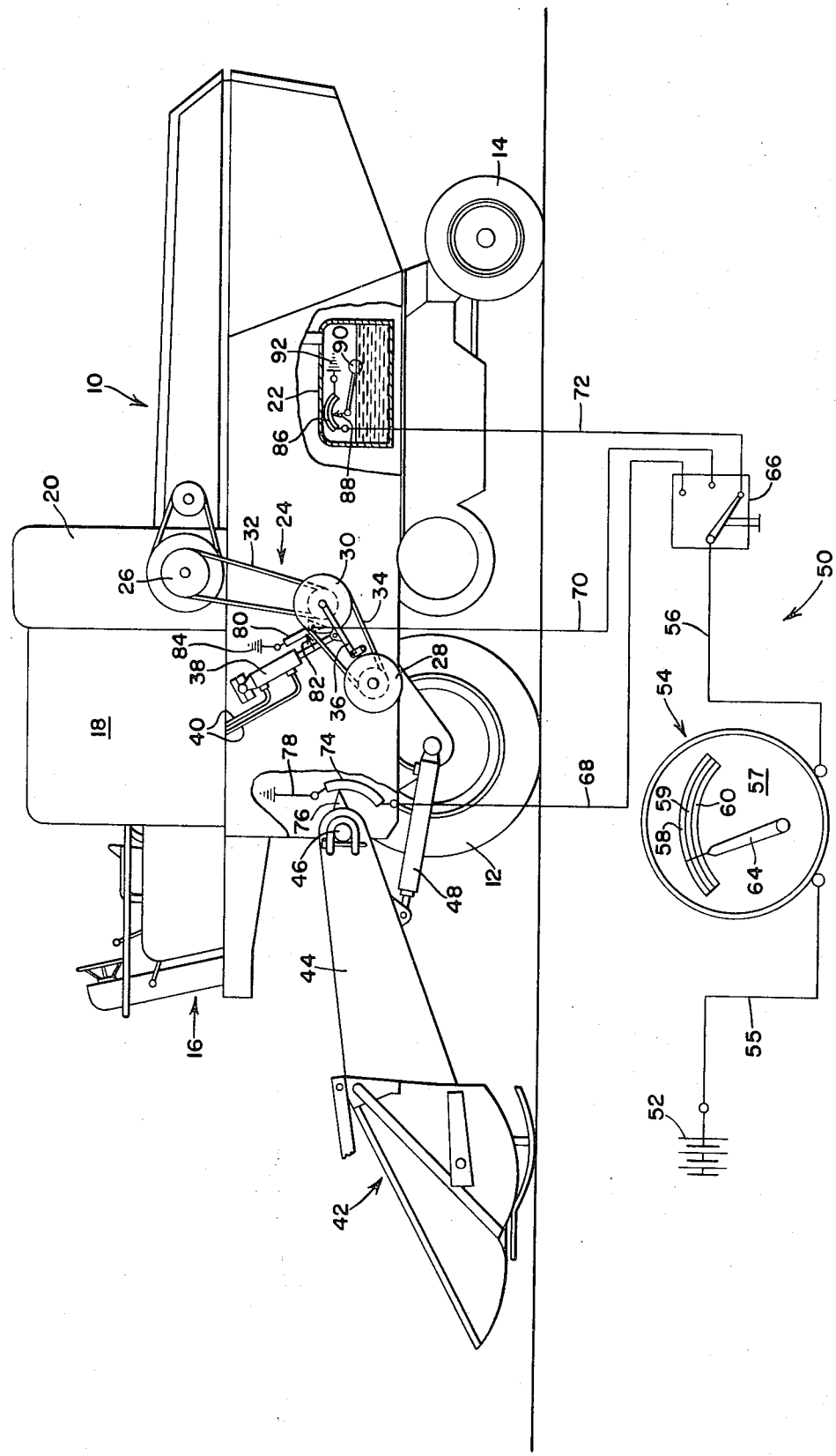

United States Patent Office 3,540,028
Patented Nov. 10, 1970

3,540,028
SYSTEM FOR INDICATING VARIABLE
HARVESTING MACHINE CONDITIONS
Mahlon Lloyd Love, Zweibrucken, Germany, assignor to
Deere & Company, Moline, Ill., a corporation of Delaware
Filed Aug. 14, 1967, Ser. No. 660,347
Claims priority, application Germany, Oct. 11, 1966,
D 51,275
Int. Cl. A01d 75/00; G08b 19/00
U.S. Cl. 340—267
3 Claims

ABSTRACT OF THE DISCLOSURE

A self-propelled combine having a vertically adjustable header, an infinitely variable belt type propulsion drive, and an integrated indicating system having a single indicator at the operator's station responsive to the current in an electric circuit, the current being alternately and selectively varied by variable resistances responsive to the vertical position of the header, the ratio in the infinitely variable drive, and the quantity of fuel in the fuel tank.

BACKGROUND OF THE INVENTION

Field of the invention

This invention relates to a system for indicating the condition of different machine functions on a harvesting machine, such as a self-propelled combine or the like.

Description of the prior art

It is known in the combine or self-propelled harvesting machinery art to provide separate indicating devices observable from the operator's station for indicating to the operator various operating conditions of the machine, such as the height of the header from the ground, the ground speed, the quantity of fuel in the fuel tank, and such engine conditions as the engine oil pressure, water temperature, and charge or discharge of the batteries. However, previous devices for indicating the position of the header have utilized mechanical measuring devices, which included various linkage arrangements for transmitting the measured position of the header to an indicator observable by the operator from the operator's station. Similarly, devices for measuring the ground speed have generally comprised a mechanical system including various linkages for measuring the ratio in the propulsion drive and transmitting the measured value to an indicator observable by the operator. However, such mechanical devices are relatively expensive and due to play and wear in the linkages, it has been found that the indicated values have been quite inaccurate.

The quantity of the fuel in the fuel tank and the various engine conditions have been indicated to the operator by means of electrical systems, each condition being indicated on a separate indicator at the operator's station. Thus, a relatively large number of both electrically and mechanically actuated indicating devices have been located at the operator's station, increasing the complexity of both the operation and the construction of the machine and adding to its cost. In view of the increasing versatility and efficiency of the machines, with their increasing complexity, it is also quite likely that additional conditions will have to be monitored by the operator, such as the speed of the threshing cylinder, the amount of crop being handled by the machine, and the amount of loss in the separator. This proliferation of indicators, of course, increases the difficulty of efficiently operating the machine.

SUMMARY OF THE INVENTION

According to the present invention, an integrated system is provided for indicating variable operating conditions of different harvesting machine components, including a single indicator selectively and alternately responsive to the conditions in the different components. Another feature of the present invention resides in the provision of an electric system for measuring the ratio in the variable ratio propulsion drive and also for measuring the position of the header. The electric type system for indicating the header position and the ratio in the infinitely variable drive provides an accurate and inexpensive indicating system, and the use of a single indicator to indicate more than one operating condition reduces the cost and complexity of the indicating system without sacrificing the availability of any information required for the efficient operation of the machine.

BRIEF DESCRIPTION OF THE DRAWING

The sole figure in the drawings is a side elevation view of a typical self-propelled combine with portions of the combine removed to more clearly disclose the invention, the indicating system which is the subject of the present invention being schematically illustrated.

DESCRIPTION OF THE PREFERRED EMBODIMENT

The harvesting machine chosen for the purpose of illustrating the invention is a self-propelled combine having a main separator body 10 mounted on a pair of forward drive wheels 12 and a pair of steerable rear wheels 14. An elevated forwardly disposed operator's station 16 is mounted on the body 10 forwardly of an elevated grain tank 18. An internal combustion engine 20 is mounted on the body rearwardly of the grain tank and has an associated fuel tank 22, also mounted on the body 10.

The combine is propelled at infinitely variable speeds by the drive wheels 12, which are connected to and driven by the engine 20 through an infinitely variable belt type drive 24. The drive 24 includes a drive pulley 26, connected to the engine, a driven pulley 28, connected to the drive wheels through a final drive mechanism (not shown), and a pair of intermediate, inversely variable diameter pulleys 30, one of which is connected to the drive pulley 26 by a belt 32, and the other of which is connected to the driven pulley 28 by a belt 34. The ratio in the drive 24 is a function of the position of the variable diameter pulleys 30, and said pulleys are mounted on a lever arm 36 for swinging into different positions, the position of the lever arm 36, in turn, being controlled by a hydraulic cylinder 38 operative between the arm and the body 10, the extension and retraction of the cylinder being controlled by the operator from the operator's station 16 in the conventional manner via hydraulic lines 40.

The combine carries a conventional forwardly disposed harvesting device or header 42, including a conventional fore-and-aft feeder house 44, through which the crop is delivered rearwardly to the main separator body 10. The entire header 42 is vertically adjustable relative to the ground on a transverse pivot 46 at the rearward end of the feeder house, the header being swingable in a vertical arc about said pivot. The header 42 can be supported on the ground during its operation or supported above the ground by a hydraulic cylinder 48 operative between the body 10 and the bottom of the feeder house 44, the cylinder 48 being conventionally controlled by a control means (not shown) manually actuatable from the operator's station 16.

The position of the header 42, the ratio in the infinitely variable belt drive 24, and the quantity of fuel in the fuel tank 22 are selectively indicated to the operator by an indicating system schematically illustrated in the drawing and identified in its entirety by the numeral 50. The indicating system 50 includes a direct current power source 52, preferably the combine battery and a current measuring indicator 54, connected to the power source 52 by a lead 55 and having an output lead 56.

The indicator has an indicator face 57 with three adjacent and coextensive scales 58, 59 and 60 respectively, the different scales being respectively labeled to span the range of header positions, machine ground speeds, and quantities of fuel in the fuel tank. A moveable indicator element or pointer 64 is positioned along the scales according to the electric current flowing between the leads 55 and 56 through the indicator 54.

The lead 56 is selectively and alternately connectable to three different leads 68, 70 and 72 by a switch 66, which is manually actuatable by the operator from the operator's station. The lead 68 is connected to one end of a variable resistor 74, the resistance of which varies with the position of a movable resistor element 76 attached to the rearward end of the feeder house 44 at the pivot 46, the movable element swinging about the pivot 46 as the header moves vertically about said pivot, so that the resistance in the variable resistor 74 varies according to the position of the header 42. A ground lead 78 grounds the resistor 74, completing an electric circuit when the lead 68 is connected to the lead 56 by the switch 66.

The variable drive means 70 is connected to a variable resistor 80, similar to the resistor 74, the resistor 80 again having a movable resistor element 82, attached to the piston of the hydraulic cylinder 38, the resistance in the variable resistor 80 being a function of the extension of the cylinder 38. The resistor 80 is grounded by a ground lead 84, completing an electric circuit when the lead 56 is connected to the lead 70 by the switch 66.

The fuel tank lead 72 is similarly connected to a variable resistor 86 associated with the fuel tank 22, the resistor 86 again having a movable member 88 connected to and movable with a float 90 within the fuel tank 22, so that the position of the member 88 and consequently the resistance of the variable resistor 86 varies with the level of fuel in the tank. The resistor 86 is grounded by a lead 92 to complete the electric circuit when the switch connects the leads 56 and 72, as shown in the drawing.

In operation, when the fuel tank lead is connected to the indicator 54 as shown in the drawing, the indicator will indicate the quantity of fuel in the tank 22, one of the scales 58, 59 or 60 being graduated with conventional fuel gauge graduations. The indicator 54 is mounted at the operator's station 16 in any convenient location for viewing by the operator during operation of the machine.

Should the operator desire to check the position of the header, he manually actuates the switch 66 to connect the leads 56 and 68 so that the position of the indicator element 64 corresponds to the position of the header, the second of the graduated scales on the indicator face being calibrated in increments of distance between the bottom of the header and the ground. Similarly, if the operator desires to check the ground speed of the combine, as determined by the ratio of the infinitely variable drive 24, he actuates the switch 66 to connect the leads 70 and 56, so that the position of the indicator element 64 is a function of the ratio in said drive, the third scale on the indicator face being calibrated in velocity increments.

The switch is left in the position to indicate the condition which the operator prefers to monitor.

Additional or different operating characteristics of the combine or combine engine could be measured by the indicating system by simply changing or adding to the scales on the indicator face and connecting variable resistors to the particular combine component so that the resistance therein varies according to the condition of the component. As is apparent from the above, the indicating system provides a flexible, inexpensive, simple, and reliable means for monitoring various operating conditions on the machine.

I claim:

1. In a self-propelled harvesting machine having an operator's station, an engine, and an infinitely variable drive means including a first adjustable element shiftable to vary the ratio in the infinitely variable drive means, the improvement comprising: an electric circuit including a source of direct current; an indicator means mounted at the operator's station and responsive to the electric current in said circuit; and a first variable resistance means operatively connected to the first adjustable element in the infinitely variable drive means to provide different resistances responsive to different positions of said element and operatively connected to the electric circuit to vary the current therein in response to variations in said resistance means.

2. The invention defined in claim 1 and including a second adjustable element shiftable to vary the operating condition of a second harvesting machine component, a second variable resistance means operatively connected to the second adjustable element to provide different resistances responsive to the different positions of the second adjustable element, and a switch means at the operator's station operatively disposed in the electric circuit and selectively actuatable to alternately connect the first or the second variable resistance means in the circuit.

3. The invention defined in claim 1 where the second adjustable element comprises a header mounted for vertical adjustment on the machine, the second variable resistance means providing a resistance that is a function of the vertical position of the header.

References Cited

UNITED STATES PATENTS

| Re. 22,470 | 4/1944 | Heyer | 324—29.5 |
| 2,957,160 | 10/1960 | Tagányi et al. | 340—52 |
| 3,138,908 | 6/1964 | Budzich. | |
| 3,442,068 | 5/1969 | Bulin. | |

FOREIGN PATENTS 1,157,464 12/1957 France.

ALVIN H. WARING, Primary Examiner

P. PALAN, Assistant Examiner

U.S. Cl. X.R.

340—282; 324—114; 116—129; 56—21, 208

PO-1050
(5/69)

UNITED STATES PATENT OFFICE
CERTIFICATE OF CORRECTION

Patent No. 3,540,028      Dated 10 November 1970

Inventor(s) Mahlon L. Love

It is certified that error appears in the above-identified patent and that said Letters Patent are hereby corrected as shown below:

Column 4, line 36, change "adjuestable" to -- adjustable --; line 42, change "1" to -- 2 --.

Signed and sealed this 11th day of May 1971.

(SEAL)
Attest:

EDWARD M. FLETCHER, JR.
Attesting Officer

WILLIAM E. SCHUYLER, JR
Commissioner of Patents